Oct. 14, 1941.    W. N. FRANK    2,259,338
UNIVERSAL JOINT
Filed Nov. 6, 1939

Inventor
Walter N. Frank
By Maréchal & Noé
Attorney

Patented Oct. 14, 1941

2,259,338

UNITED STATES PATENT OFFICE 2,259,338

UNIVERSAL JOINT

Walter N. Frank, Miamisburg, Ohio, assignor to The Apex Machine and Tool Company, Dayton, Ohio, a corporation of Ohio Application November 6, 1939, Serial No. 303,076

4 Claims. (Cl. 64—18)

This invention relates to universal joints for coupling driving and driven members and transmitting movement from one to the other.

One object of the invention is the provision of a universal joint of great strength and embodying a comparatively few simple and readily constructed parts including an integral annular drive member so arranged as to directly transmit torque between a pair of pivotally connected yoke members.

Another object of the invention is the provision of a universal joint having inner and outer strain assuming parts engaging the inner and outer sides of the arms of two yoke members to which the strain assuming parts are pivoted.

Another object of the invention is the provision of a universal joint having a torque transmitting annular drive member in direct bearing engagement with the flat outer sides of the arms of two yokes that are interconnected by transversely extending pivot pins retained in the drive member, the latter having internal flat surfaces engaging the outer sides of the yoke arms with an operating clearance that is small enough to provide for transmission of torque from one yoke to the other through the drive member without substantially straining the pivot pins.

Other objects and advantages of the invention will be apparent from the following description, the appended claims, and the accompanying drawing, in which a preferred embodiment of the invention has been illustrated, and in which Fig. 1 is a side elevation of a universal joint embodying the present invention;

Figure 1:
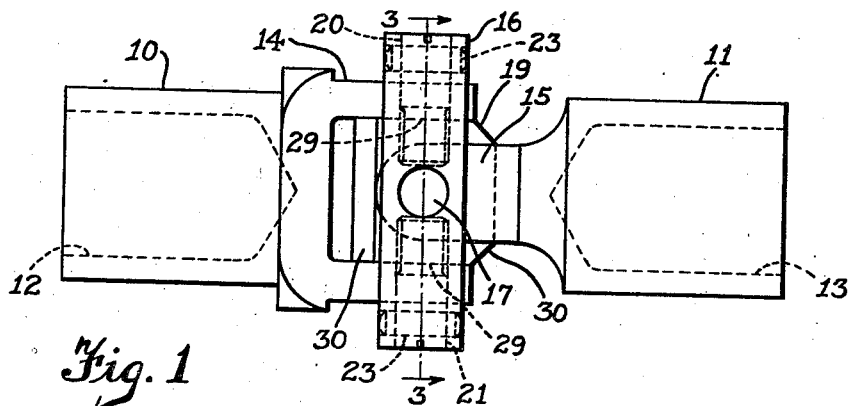
Figure 2:
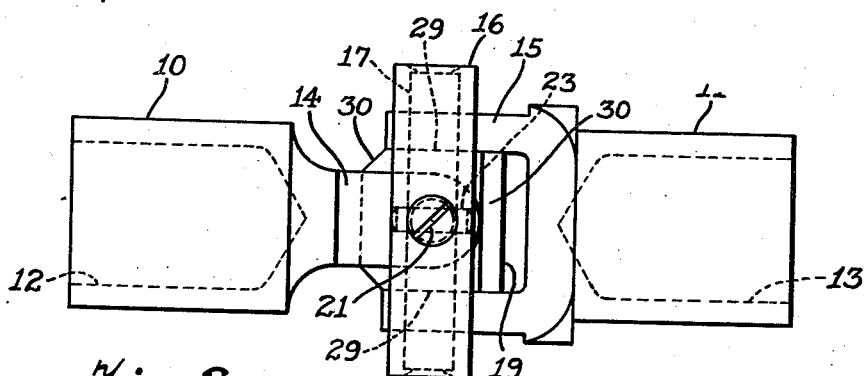
Fig. 2 is a top plan view of the universal joint.
Figure 3:
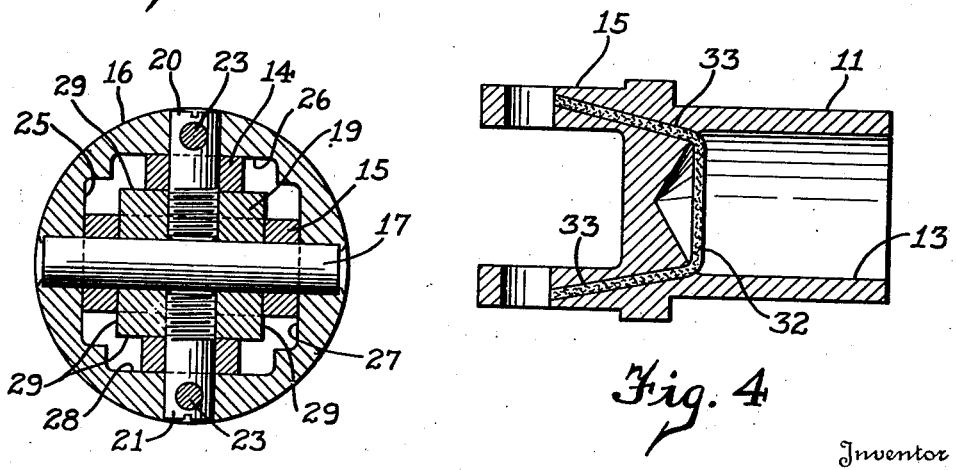
Fig. 3 is a central vertical section on the line 3—3 of Fig. 1.

Referring more particularly to the drawing by reference numerals, 10 and 11 designate two yoke members which are arranged at right angles to one another, each having a pair of projecting yoke arms and having socket portions 12 and 13 which are adapted to be secured to operating rods or the like for transmission of rotative and also axial movements from an operating to an operated part while permitting disalignment of those parts. Such a universal joint is adapted for many uses, such as for transmission of force in the operation of aircraft controls.

The two arms 14 of the yoke 10 are pivotally interconnected to the two arms 15 of the yoke 11 by pivot pins having their outer ends secured in a rigid integral force transmitting member 16 which extends around the arms. As shown, there is a pivot pin 17 whose length is slightly less than the outside diameter of member 16, the latter being peened over the ends of this pin to retain it against endwise movement. The pin passes with suitable operating clearance through bores provided in the arms 15 and extends through a block 19 which is arranged inside of the several arms. Extending transversely of the pin 17 are two pins 20 and 21 threaded at their inner ends into threaded sockets provided in the block 19. These pins 20 and 21 extend with suitable operating clearance through bores provided in the arms 14 and through suitable passages in the force transmitting member 16. They are retained against movement in the member 16 by means of small retainer pins 23 which extend transversely through these pins and through small passages provided in the member 16.

The force transmitting member 16 is a one-piece annular part, in the form of a hollow disk of considerable radial thickness and of somewhat greater width than the pivot pin diameter. Its peripheral surface is of cylindrical form while internally it is provided with four flat bearing surfaces 25, 26, 27 and 28. The two bearing surfaces 26 and 28 engage the outer flat sides of the arms 14, and the bearing surfaces 25 and 27 engage the outer sides of the arms 15. These bearing surfaces provide a generally square opening receiving the ends of the yoke arms with a comparatively small operating clearance preferably of the order of one thousandth of an inch or less between the outer side of a yoke arm and its respective bearing surface on the annular drive member. The operating clearance is so small as to maintain the yoke arms in cooperating bearing contact with the drive member, and at least a considerable part of the torque will be transmitted from one pair of yoke arms to the other pair through the sides of these arms and relieve the pins from excessive strain.

By having the operating clearance between yoke arms and the bearing surfaces of member 16 somewhat smaller than the clearance between yoke arms and pivot pins a full pressure transmitting contact between yoke arms and member 16 is obtained before any substantial torque will be applied from the yoke arms to the pins, thus relieving the pins. The clearance between the yoke arms and the bearing surfaces of member 16 may be made so small in comparison to the pivot pin clearance as to relieve the pivot pins from all substantial forces in the transmission of torque.

The outer side of each of the yoke arms is flat throughout that portion of the arm that is at any time received between the opposite sides of the drive member 16 so that even if the axis of the yoke 10 is displaced out of alignment with the axis of the yoke 11 through a large angle, the entire portion of the yoke arms that lie adjacent the bearing surfaces of the drive member will have full contact with it. The effectiveness of force transmission is thus increased at times when one yoke is arranged considerably out of line with the other. Under such conditions the area of engagement between a yoke arm and its respective bearing surface on the drive member reaches out to a point more remote from the axis of the coupling pin and applies a turning force at a more effective location.

As the outer surface of the guide member is of cylindrical form and there is a substantially square internal opening, there will be radially enlarged portions at the coupling pin locations. The pin retaining bores in the drive member may thus be made of considerable length, and large axial thrust forces as well as rotational forces will be effectively transmitted from one yoke member to the other.

The block 19 is provided with flat bearing surfaces 29 arranged in bearing contact with the inner sides of the yoke arms, and having a small operating clearance of the order of one thousandth of an inch. This clearance may be small enough so that the block will assume some substantial part of a torque load and serve in the transmission of rotational forces. It cooperates with the annular member 16 in definitely restraining the arms of the yokes against deflection in any radial direction, the bearing surfaces on the block 19 and on the annular member 16 serving to hold the yoke arms against bearing or deflection either outwardly or inwardly, and prevent the application of any excessive strain on the coupling pins. As will be apparent from Fig. 1, the block 19 is provided with beveled surfaces 30 at the corners so as to permit a large angular displacement of the axes of the two yokes without having the block contact with the inner portions of the yokes between the yoke arms.

Figure 4:
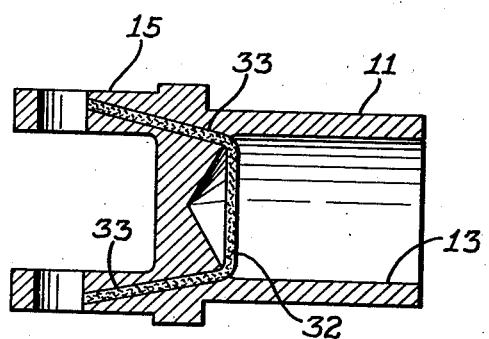
Fig. 4 is a longitudinal section through one of the yokes.

The yoke member 11, as shown in Fig. 4, is provided with an oil wick 32 extending across the inside of the yoke and out through diverging holes 33 to the pivot pin location, to furnish an adequate supply of oil to the pivot pin. The oil supply to the pivot pin finds its way to the bearing surfaces between the yoke arms and the inner and outer thrust transmitting parts. The other yoke member 10 is provided with a similar wick.

As will be apparent, the universal joint is of very strong construction and embodies a comparatively few simple and readily constructed parts. The assembly of the parts is a simple operation, especially since the diameters of the several pins are uniform. In service there is assurance against accidental loosening of any of the parts that might permit separation of the yoke members, although the construction is such that there may be an intentional separation of the yoke members by removing the peened over portion of the member 16 that extends over one end of the pin 17 and then driving this pin endwise so that the yoke 11 can be removed from the other yoke on which the block 19 and the member 16 are retained.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A universal joint comprising a pair of yokes each having a pair of spaced projecting arms, pivot pins extending through the arms of the yokes, and an integral annular drive member having passages in which the outer ends of the pins are contained, said drive member having a substantially square opening of constant cross sectional form in an axial direction to provide four internal plane surfaces each considerably wider than the width of the portions of the yoke arms which are movable within the confines of the drive member and engaging the outer sides of the arms of the yokes with an operating clearance that is small enough as compared to the pivot pin clearance in the yokes to insure the transmission of torque through the sides of the yoke arms directly to the drive member, each yoke arm contacting the drive member only on a plane outer side of the arm, the inner side of each arm of a yoke, when the yoke axes are aligned, lying in a plane which is spaced a substantial distance outwardly of the two adjacent arms of the other yoke and affording a wide angle of misalignment of the yoke axes without arm interference.

2. A universal joint comprising a pair of yokes each having a pair of spaced projecting arms, pivot pins extending through the arms of the yokes, and an integral annular drive member having passages in which the outer ends of the pins are contained, said member having four internal plane surfaces, the inner side of any yoke arm lying in a plane which is spaced a substantial distance outwardly of the two adjacent arms of the other yoke, when the yokes are in alignment, and affording a wide angle of misalignment of the yoke axes without arm interference, each yoke arm contacting the drive member only on a plane outer side of the arm and the outer side of each yoke arm throughout the portion of the arm that is receivable within the confines of the drive member having a plane surface engaging its respective plane surface of the drive member with an operating clearance small enough as compared to the pivot pin clearance in the yokes to insure transmission of torque from the outer side of the arms of one yoke to the outer sides of the arms of the other directly through the drive member.

3. A universal joint comprising a pair of yokes each having a pair of spaced projecting arms, pivot pins extending through the arms of the yokes, and an integral annular drive member having passages in which the outer ends of the pins are contained, said member having a substantially cylindrical outer surface and having four internal plane surfaces each extending the full axial length of the drive member and of substantially rectangular form and each considerably wider than the width of the portions of the yoke arms which are receivable within the confines of the drive member and engaging the outer sides of the yoke arms with an operating clearance what is small enough as compared to the pivot pin clearance in the yokes to insure the transmission of torque through the sides of the yoke arms directly to the drive member, the inner side of each arm of a yoke, when the yoke axes are aligned, lying in a plane which is spaced a substantial distance outwardly of the two adjacent arms of the other yoke and affording a wide angle of misalignment of yoke axes, and the outer side of each arm throughout the portion of the arm that is receivable within the drive member, having a plane thrust surface engaging the drive member and of no less width where the arm enters the drive member than at any other point interior thereof, said plane thrust surface providing the sole area of contact of the arm with the drive member.

4. A universal joint comprising a pair of yokes each having a pair of yoke arms, pivot pins extending through the arms of the yokes, an annular drive member receiving the ends of the yoke arms and secured to the ends of the pins, said drive member having a substantially square opening of constant cross sectional form in an axial direction and providing four internal plane surfaces each of substantially rectangular form engaging the outer sides of the arms of the yokes, the inner side of a yoke arm lying in a plane which is spaced a substantial distance outwardly of the two adjacent arms of the other yoke to afford a wide angle of misalignment of the yoke axes, each yoke arm having a plane outer surface providing the sole area of contact of the arm with the drive member and a bearing block secured to the inner portions of the pins and provided with four plane surfaces engaging the inner sides of the yoke arms, the clearance between the outer sides of the yoke arms and the drive member and between the inner sides of the yoke arms and the bearing block being less than the pivot pin clearance in the yokes and insuring transmission of torque through the sides of the yoke arms and to internally and externally brace the arms against deflection in any radial direction.

WALTER N. FRANK.